No. 664,538. Patented Dec. 25, 1900.
A. B. C. DOWDELL.
APPARATUS FOR AGING WINES OR LIQUORS.
(Application filed Mar. 28, 1900.)
(No Model.)
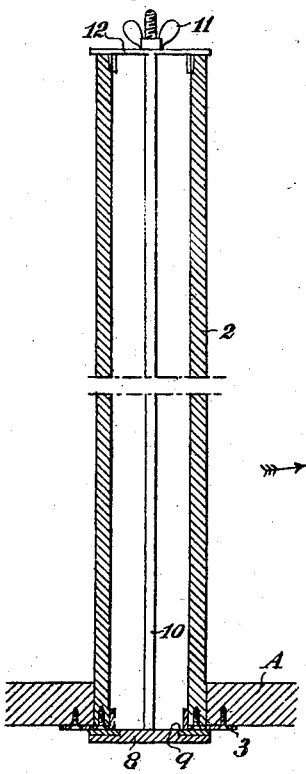
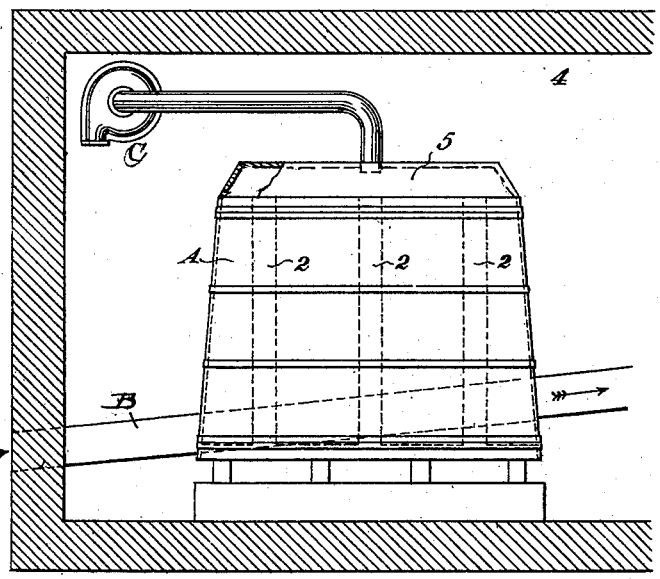
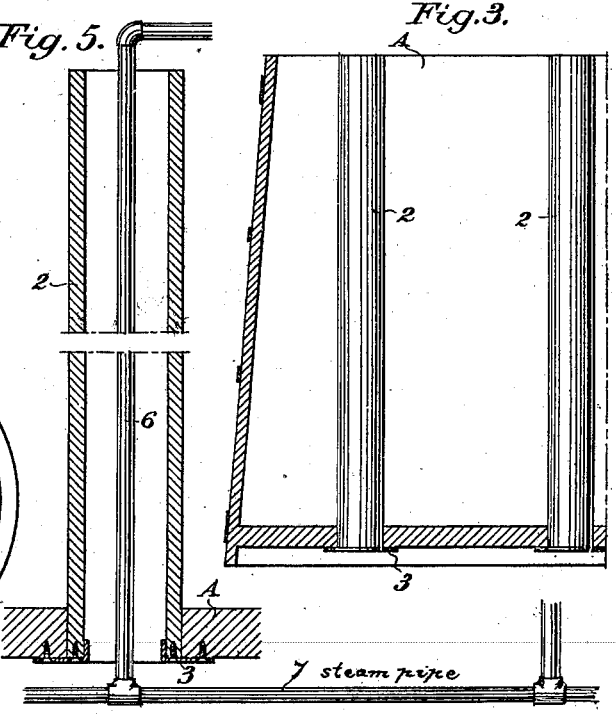
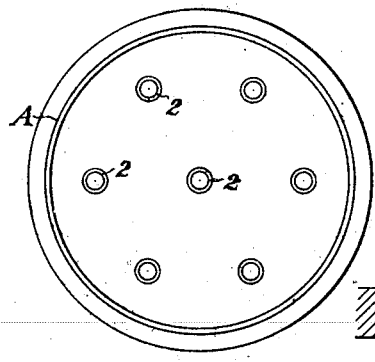
Witnesses,
E. A. Brandau
J. A. Morse
Inventor,
Arthur B. C. Dowdell
By Dewey Strong & Co.
Attys.
THE NORRIS PETERS CO., PHOTO-LITHO., WASHINGTON, D. C.

UNITED STATES PATENT OFFICE.

ARTHUR B. C. DOWDELL, OF ST. HELENA, CALIFORNIA.

APPARATUS FOR AGING WINES OR LIQUORS.

SPECIFICATION forming part of Letters Patent No. 664,538, dated December 25, 1900.

Application filed March 28, 1900. Serial No. 10,469. (No model.)

*To all whom it may concern:*

Be it known that I, ARTHUR B. C. DOWDELL, a citizen of the United States, residing at St. Helena, county of Napa, State of California, have invented an Improvement in Apparatus for Aging Wines or Liquors; and I hereby declare the following to be a full, clear, and exact description of the same.

My invention relates to a device which is especially designed for aging wines, liquors, and the like.

It consists of a wooden tank having tubes passing through, with means for making tight joints between them and the tank and means for causing a circulation of heated air through said tubes and around the tank within a closed room.

It also comprises details of construction, which will be more fully explained by reference to the accompanying drawings, in which—

Figure 1 is a view of my device. Fig. 2 is a plan of a tank, showing the pipes. Fig. 3 is a section of a portion of a tank on an enlarged scale. Fig. 4 is an enlarged section of a tube. Fig. 5 is a modification of the same.

My invention is designed for the aging of wines, liquors, and the like, and is especially useful in the construction of what are known as "sherry-ovens," or apparatus for the "cooking," as it is termed, of sherry wine in order to bring out its qualities. This wine is greatly improved by exposing it for some months to a heat of about 140°, and various methods have been devised for accomplishing the result.

In my invention I have shown a vertically-disposed tank A of sufficient size to contain a large quantity—as ten thousand gallons—of sherry wine. This tank is here shown as standing with its axis vertical and is sufficiently raised above the floor of the room in which it is contained to allow free access to the lower part and is correspondingly separated a sufficient distance from the upper part of the room. Through this tank pass the pipes 2, which may be made of any suitable diameter, as six inches, and they are made tight while they pass through the bottom of the tank A by means of plates 3, which are fixed to the bottom of the tank, surrounding the mouth of each tube, and have flanges turned upwardly within the tube, or are secured directly against the bottom thereof, and by suitable calking or fastening they would prevent any leakage around the tube. One or more of these tanks may be set up in a room 4, which is of sufficient capacity, and by any suitable means the heating of the room is kept up to approximately 140° Fahrenheit. This may be effected by steam-pipe B, coil, or other suitable means, and the heated air will raise the temperature of the tank and the wine within it to about the same degree, and by reason of the low conductivity of the wood there will be little or no variation in the interior temperature after it has once been attained.

It has been customary to heat sherry wine for the purpose of curing or aging it in small puncheons; but this is an expensive method, and by using the large tank with suitable heating-tubes therethrough I am enabled to keep all portions of the large body of wine at the proper temperature and at the same time maintain it in contact with the wood only, which is the proper way to maintain its flavor unimpaired.

The circulation through the tubes may be effected either naturally by reason of the lower temperature of the interior of the tubes, which would cause a downward movement of the heated air from the top of the room through these tubes, to be again heated and to rise exterior to the tank, or it may be directly effected by means of a small suction-fan C, connected with a chamber which incloses the upper part of the tank, as shown at 5, so that a direct draft or forcing of the air through the tubes may be effected, the air being circulated by means of the fan-blower acting either as a suction or force apparatus. It is also evident that the circulation of the air and the proper heating of it within the tubes may be effected by means of steam-pipes, as shown at 6, these pipes extending centrally up through the tubes and being connected with the heating-pipes 7, Fig. 3, which may also serve to heat the remainder of the room. I do not confine myself to any especial means for producing this circulation, but desire generally to employ any means by which the proper circulation of the heat may be effected and the heat of the wine within the tank maintained at the proper temperature and at the least expenditure.

When the tank is to be emptied, there is danger that the tubes will become dry and leaky. For this reason I have designed a means for keeping the tubes moist. It consists of a disk or plate 8, fitted to the bottom of each tube with a gasket 9 for forming a tight joint. Secured to this disk is a screw-rod 10, which extends to the top, and a nut 11 is adapted to screw down upon a bar 12, which extends across the top of the tube. The plate 8 having been fitted snugly against the bottom of the tube, the latter may be filled with water, and when the wine has been drawn off the tube will be prevented from contracting and becoming leaky. When a tank is again to be filled with wine, the water can be drawn off from the tubes and the closures removed to allow the heated air to be again employed.

It will be understood that tubes of wood or porcelain or otherwise coated metal which will not injure the flavor of the wine may be used, and they may be fixed vertically or horizontally within the tank with means to produce a circulation through them.

Having thus described my invention, what I claim as new, and desire to secure by Letters Patent, is—

1. An apparatus for aging wines including a tank having tubes extending through it, an exterior chamber inclosing said tank, means for heating the chamber, and an air-forcing mechanism connecting with the tubes whereby heated air is circulated through said tubes.

2. An apparatus for aging wines including a tank having tubes extending vertically through it, a chamber inclosing the tank, means for heating the chamber and means for inducing a circulation of hot air downwardly through the tubes.

3. An apparatus for aging wines including a tank, vertical tubes arranged therein and opening into spaces above and below the tank, a tight chamber inclosing the tank, means for heating the chamber, and means in the upper portion of the chamber for forcing the hot air downwardly through the tubes and inducing a circulation of air within the chamber.

4. An apparatus for aging wines including a tank, tubes vertically arranged in the tank, a chamber inclosing the tank, means for heating the chamber, and means for circulating the heated air within the chamber and forcing said air downwardly through the tubes.

5. An apparatus for aging wines including a tank, a casing fitting the upper part of the tank, vertical tubes in said tank, the upper ends of said tubes opening into said chamber, a tight inclosure about the tank, means for heating the inclosure, and means connecting the inclosure with the casing on top of the tank and circulating the hot air of the inclosure through the tubes.

6. An apparatus for aging or ripening wines and the like consisting of a wooden tank with a vertical axis, tubes extending through said tank, a tight chamber in which the tank is supported with spaces at top and bottom for the circulation of air, means for heating the chamber and means for circulating the air within the room and downwardly through the tubes.

7. An apparatus for aging and ripening wines and the like, consisting of a wooden tank, tubes extending therethrough and disks or plates fitting and secured to the lower ends of the tubes and the tank-bottom and spanning the joints between the tubes and the holes in the bottom through which the tubes pass.

8. An apparatus for aging or ripening wines and the like consisting of a vertical wooden tank having vertical tubes extending from top to bottom, and means including flanged plates fitted to the ends of the tube for forming close joints with the tank-bottom, an exterior chamber within which the tank is contained, means for heating and means for circulating the air through the tank and within the chamber, and means for protecting the tubes against leakage when the wine is withdrawn from the tank, consisting of disks fitting over the bottoms of the tubes, and screw-rods extending upwardly, transverse bars at the tops, and nuts screwing upon the upper ends of the rods by which the closure-plates at the bottom are drawn tight whereby the tubes may be filled with liquid to prevent contraction.

In witness whereof I have hereunto set my hand.

ARTHUR B. C. DOWDELL.

Witnesses:
S. H. NOURSE,
JESSIE C. BRODIE.